(12) United States Patent
Chavda et al.

(10) Patent No.: US 9,836,710 B2
(45) Date of Patent: *Dec. 5, 2017

(54) RESOURCE PLANNING FOR DATA PROTECTION VALIDATION

(71) Applicant: International Business Machines Corporation, Armonk, NY (US)

(72) Inventors: Kavita Chavda, Roswell, GA (US); Nagapramod S. Mandagere, San Jose, CA (US); Steven Pantridge, Delson (CA); Ramani R. Routray, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 71 days.

This patent is subject to a terminal disclaimer.

(21) Appl. No.: 15/072,448

(22) Filed: Mar. 17, 2016

(65) Prior Publication Data

US 2016/0203057 A1 Jul. 14, 2016

Related U.S. Application Data

(63) Continuation of application No. 14/528,807, filed on Oct. 30, 2014, now Pat. No. 9,330,369, which is a (Continued)

(51) Int. Cl.
*G06F 11/00* (2006.01)
*G06Q 10/06* (2012.01)
(Continued)

(52) U.S. Cl.
CPC ..... *G06Q 10/06315* (2013.01); *G06F 3/0484* (2013.01); *G06F 11/3672* (2013.01);
(Continued)

(58) Field of Classification Search
CPC ............ G06F 11/1629; G06F 11/1653; G06F 11/1645; G06F 2201/82; G06F 2201/835; G06F 11/1446–11/1469

See application file for complete search history.

(56) References Cited

U.S. PATENT DOCUMENTS 7,546,323 B1 6/2009 Timmins et al.
7,917,617 B1 3/2011 Ponnapur et al.
(Continued)

OTHER PUBLICATIONS

Lohn, Joshua A., U.S. Appl. No. 13/482,455, Office Action, dated May 30, 2014, 10 pgs.
(Continued)

*Primary Examiner* — Jason Bryan
(74) *Attorney, Agent, or Firm* — Maeve L. Carpenter; Hoffman Warnick LLC (57) ABSTRACT

A solution for validating a set of data protection solutions is provided. A validation scenario can be defined, which can include data corresponding to a set of attributes for the validation scenario. The attributes can include a time frame for the validation scenario. The validation scenario also can include a set of backup images to be validated, each of which is generated using one of the set of data protection solutions. The set of backup images can be identified using the time frame. A set of resource requirements for implementing the validation scenario can be determined based on the set of backup images and the set of attributes for the validation scenario.

19 Claims, 6 Drawing Sheets

Related U.S. Application Data continuation of application No. 13/482,455, filed on May 29, 2012, now Pat. No. 8,924,792.

(51) Int. Cl.
*G06F 17/30* (2006.01)
*G06F 11/36* (2006.01)
*G06F 3/0484* (2013.01)
*G06F 11/14* (2006.01)

(52) U.S. Cl.
CPC .... *G06F 17/30371* (2013.01); *G06F 11/1458* (2013.01); *G06F 2201/82* (2013.01); *G06F 2201/835* (2013.01)

(56) References Cited

U.S. PATENT DOCUMENTS

| | | | |
|---|---|---|---|
| 7,925,630 B1 | 4/2011 | Krishnamurthy et al. |
| 8,020,037 B1 | 9/2011 | Schwartz et al. |
| 8,359,493 B2 | 1/2013 | Peng et al. |
| 8,538,919 B1 | 9/2013 | Nielsen et al. |
| 8,676,753 B2 | 3/2014 | Sivasubramanian et al. |
| 8,966,318 B1 | 2/2015 | Shah |
| 2004/0143719 A1 | 7/2004 | Nguyen et al. |
| 2006/0075148 A1 | 4/2006 | Osaki |
| 2006/0242489 A1 | 10/2006 | Brockway et al. |
| 2007/0214196 A1 | 9/2007 | Garimella et al. |
| 2010/0146231 A1 | 6/2010 | Gopalan et al. |
| 2011/0087874 A1 | 4/2011 | Timashev et al. |
| 2011/0154127 A1 | 6/2011 | Bhandari et al. |
| 2013/0006927 A1 | 1/2013 | Brockway et al. |

OTHER PUBLICATIONS

Lohn, Joshua A., U.S. Appl. No. 13/482,455, Notice of Allowance, dated Aug. 22, 2014, 5 pgs.

Lohn, Joshua A., U.S. Appl. No. 14/528,807, Office Action, dated Aug. 10, 2015, 10 pgs.

Lohn, Joshua A., U.S. Appl. No. 14/528,807, Notice of Allowance, dated Feb. 8, 2016, 8 pgs.

Select Server(s) for Validation:

| Customer | Server Name | IP Address | Data Protection Solution Type |
|---|---|---|---|
| ☒ Cust1 | ☒ C1ServerA | sa.cust1.com | Solution A |
| | ☐ C1ServerB | sb.cust1.com | Solution B |
| ☐ Cust2 | | | |
| ☒ Cust3 | ☒ C3ServerA | sa.cust3.com | Solution C |
| | ☒ C3ServerB | sb.cust3.com | Solution A |

— 62
← 63

Select Object(s) to be Validated for Selected Server: — 64

| Node/Object | Capacity | Object Type | OS | Agent | Recommendation |
|---|---|---|---|---|---|
| ☒ Node1 | | | | | |
| ☐ N1ObjectA | | | | | |
| ☒ N2ObjectB | | | | | |
| ☐ Node2 | | | | | |
| ☒ Node3 | | | | | |
| ☐ N3ObjectA | | | | | |
| ☒ C3ObjectB | | | | | |

Validation Time Frame: Start Date: 01/01/2012   End Date: 01/14/2012 ← 66

Current Validation Requirements: — 68

| Platform | Backup Client Details | Application | Required Space |
|---|---|---|---|
| PlatformA | ClientA | App1 | GB1 |
| PlatformB | ClientB | App2 | GB2 |
| PlatformC | ClientB | | GB3 |

RESOURCE PLANNING FOR DATA PROTECTION VALIDATION

TECHNICAL FIELD

The disclosure relates generally to data protection validation, and more particularly, to resource planning for performing data protection validation.

BACKGROUND ART

Based on sensitivities to downtime, organizations can apply different strategies to protect (e.g., backup) business critical data. Although the data protection strategies can vary, effective data protection is a necessary part of an overall risk management strategy for a business. Some businesses elect to utilize the services of a third party service provider for managing their data protection. Such a service provider will frequently commit to a certain set of terms for the data protection, including, for example, backup data coverage, frequency of backup, mode of backup, and periodic testing of the backup.

Testing a backup (e.g., validating the integrity of backup images) is a critical part of a complete data protection environment. Such testing is necessary to evaluate the quality and completeness of the backup images, and enable any problems with the data protection to be identified and rectified prior to requiring use of the backup to recover data. However, this testing often gets low priority due to several factors, including: i) unavailability of the necessary hardware and software resources; ii) the required skill set for performing the testing effectively (e.g., labor intensive, intrusive/non-intrusive due to regulations that apply to the data); iii) sampling required from numerous backup images; and iv) scheduling the testing procedure.

SUMMARY OF THE INVENTION

The inventors recognize that the unavailability of the necessary hardware and software resources is a significant impediment to performing effective and timely testing of backup data. This problem is compounded for a service provider, which often is managing a complex and heterogeneous data protection environment for multiple customers, each of which can have a unique set of terms for the data protection and its testing.

Aspects of the invention provide a solution for validating a set of data protection solutions. A validation scenario can be defined, which can include data corresponding to a set of attributes for the validation scenario. The attributes can include a time frame for the validation scenario. The validation scenario also can include a set of backup images to be validated, each of which is generated using one of the set of data protection solutions. The set of backup images can be identified using the time frame. A set of resource requirements for implementing the validation scenario can be determined based on the set of backup images and the set of attributes for the validation scenario.

A first aspect of the invention provides a computer-implemented method of validating a set of data protection solutions, the method including: defining a validation scenario for the set of data protection solutions using a computer system, wherein the defining includes identifying a set of backup images for the validation scenario using a time frame, wherein each backup image in the set of backup images is generated using one of the set of data protection solutions; and determining, by the computer system, a set of resource requirements for implementing the validation scenario, by automatically generating the set of resource requirements for the validation scenario based on the set of backup images and a set of attributes for the validation scenario.

A second aspect of the invention provides a computer system comprising: a set of computing devices for validating a set of data protection solutions by performing a method comprising: defining a validation scenario for the set of data protection solutions using a computer system, wherein the defining includes identifying a set of backup images for the validation scenario using a time frame, wherein each backup image in the set of backup images is generated using one of the set of data protection solutions; and determining, by the computer system, a set of resource requirements for implementing the validation scenario, by automatically generating the set of resource requirements for the validation scenario based on the set of backup images and a set of attributes for the validation scenario.

A third aspect of the invention provides a computer program product comprising program code embodied in at least one computer-readable storage medium, which when executed, enables a computer system to implement a method of validating a set of data protection solutions, the method comprising: defining a validation scenario for the set of data protection solutions using a computer system, wherein the defining includes identifying a set of backup images for the validation scenario using a time frame, wherein each backup image in the set of backup images is generated using one of the set of data protection solutions; and determining, by the computer system, a set of resource requirements for implementing the validation scenario, by automatically generating the set of resource requirements for the validation scenario based on the set of backup images and a set of attributes for the validation scenario.

A fourth aspect of the invention provides a method of generating a computer system, the method comprising: providing a computer system configured to perform a method for validating a set of data protection solutions, the method including: defining a validation scenario for the set of data protection solutions using a computer system, wherein the defining includes identifying a set of backup images for the validation scenario using a time frame, wherein each backup image in the set of backup images is generated using one of the set of data protection solutions; and determining, by the computer system, a set of resource requirements for implementing the validation scenario, by automatically generating the set of resource requirements for the validation scenario based on the set of backup images and a set of attributes for the validation scenario.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution for validating a set of data protection solutions. A validation scenario can be defined, which can include data corresponding to a set of attributes for the validation scenario. The attributes can include a time frame for the validation scenario. The validation scenario also can include a set of backup images to be validated, each of which is generated using one of the set of data protection solutions. The set of backup images can be identified using the time frame. A set of resource requirements for implementing the validation scenario can be determined based on the set of backup images and the set of attributes for the validation scenario. An embodiment enables a user to progressively drill down into a backup hierarchy to define the set of backup images. Another embodiment enables the user to perform a what-if analysis by dynamically updating the resource requirements based on a change in the validation scenario by the user. As used herein, unless otherwise noted, the term "set" means one or more (i.e., at least one) and the phrase "any solution" means any now known or later developed solution.

Figure 1:
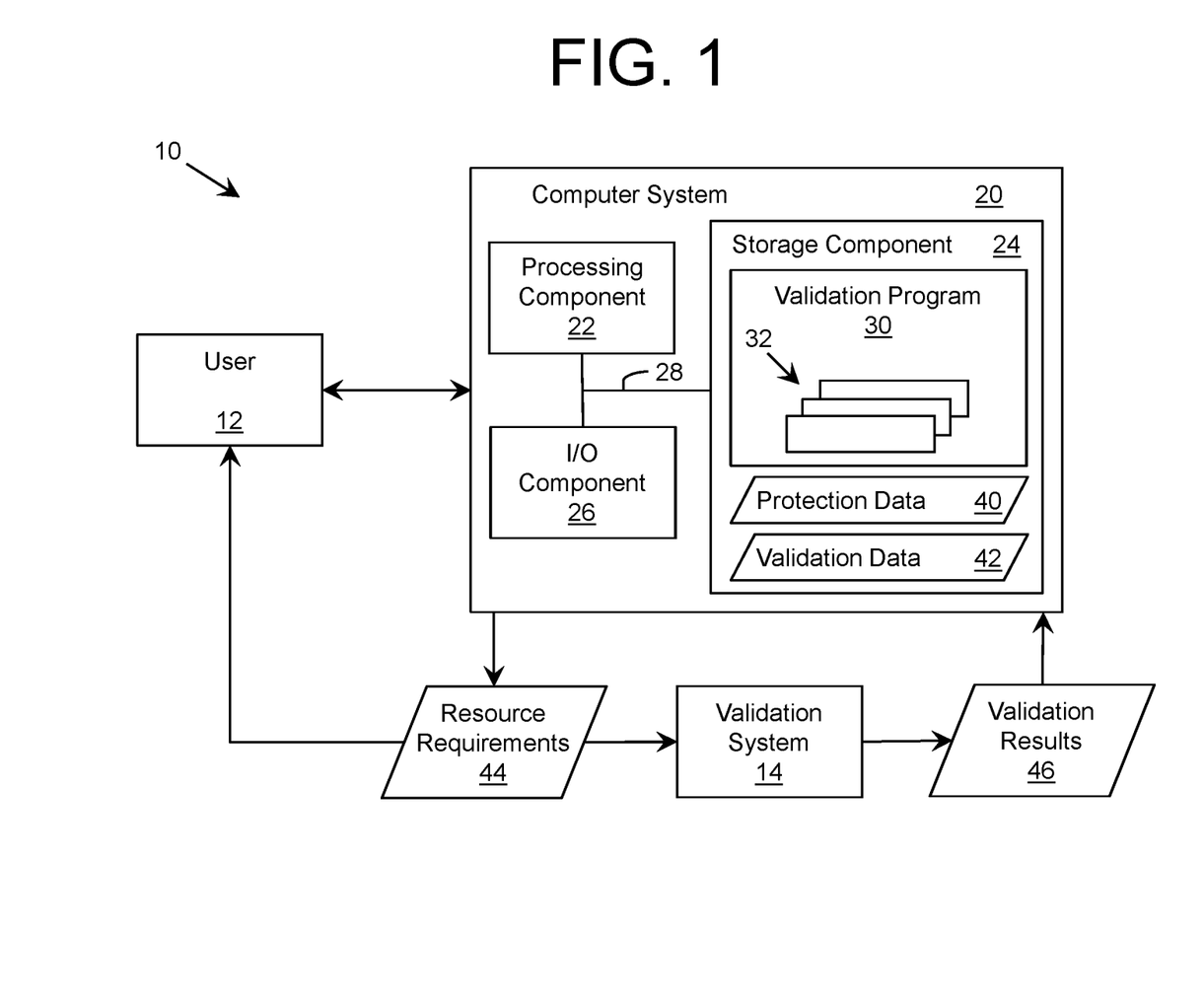
FIG. 1 shows an illustrative environment for validating a set of data protection solutions according to an embodiment.

Turning to the drawings, FIG. 1 shows an illustrative environment 10 for validating a set of data protection solutions according to an embodiment. To this extent, environment 10 includes a computer system 20 that can perform a process described herein in order to validate the set of data protection solutions. In particular, the computer system 20 is shown including a validation program 30, which makes the computer system 20 operable to validate the set of data protection solutions by performing a process described herein.

The computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, the processing component 22 executes program code, such as the validation program 30, which is at least partially fixed in the storage component 24. While executing program code, the processing component 22 can process data, which can result in reading and/or writing transformed data from/to the storage component 24 and/or I/O component 26 for further processing. The pathway 28 provides a communications link between each of the components in computer system 20. The I/O component 26 can comprise one or more human I/O devices, which enable a human user 12 to interact with the computer system 20 and/or one or more communications devices to enable a system user 12 to communicate with the computer system 20 using any type of communications link. To this extent, the validation program 30 can manage a set of interfaces (e.g., graphical user interface(s), application program interface, and/or the like) that enable human and/or system users 12 to interact with the validation program 30. Furthermore, the validation program 30 can manage (e.g., store, retrieve, create, manipulate, organize, present, etc.) the data, such as protection data 40 and/or validation data 42, using any solution.

In any event, the computer system 20 can comprise one or more general purpose computing articles of manufacture (e.g., computing devices) capable of executing program code, such as the validation program 30, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the validation program 30 can be embodied as any combination of system software and/or application software.

Furthermore, the validation program 30 can be implemented using a set of modules 32. In this case, a module 32 can enable the computer system 20 to perform a set of tasks used by the validation program 30, and can be separately developed and/or implemented apart from other portions of the validation program 30. As used herein, the term "component" means any configuration of hardware, with or without software, which implements the functionality described in conjunction therewith using any solution, while the term "module" means program code that enables a computer system 20 to implement the actions described in conjunction therewith using any solution. When fixed in a storage component 24 of a computer system 20 that includes a processing component 22, a module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 20.

When the computer system 20 comprises multiple computing devices, each computing device can have only a portion of the validation program 30 fixed thereon (e.g., one or more modules 32). However, it is understood that computer system 20 and the validation program 30 are only representative of various possible equivalent computer systems that may perform a process described herein. To this extent, in other embodiments, the functionality provided by the computer system 20 and the validation program 30 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 20 includes multiple computing devices, the computing devices can communicate over any type of communications link. Furthermore, while performing a process described herein, the computer system 20 can communicate with one or more other computer systems using any type of communications link. In either case, the communications link can comprise any combination of various types of optical fiber, wired, and/or wireless links; comprise any combination of one or more types of networks; and/or utilize any combination of various types of transmission techniques and protocols.

As discussed herein, the validation program 30 enables the computer system 20 to perform a method of validating a set of data protection solutions. To this extent, the protection data 40 can include data defining the set of data protection solutions, which can include one or more types of data protection solutions. For example, each type of data protection solution can have a corresponding set of backup attributes including, for example, a level of granularity for the backup, a type of backup (e.g., full, incremental, and/or the like), a frequency with which the data is backed up, an amount of time that backup data is retained, backup tool(s) utilized to backup the data, configuration information for each backup tool, and/or the like. Furthermore, each type of data protection solution can have a set of restore attributes including, for example, a level of granularity for the restoration, a mode for the restoration (e.g., point in time, roll forward, and/or the like), a target recovery time objective (RTO), a target recovery point objective (RPO), restore tool(s) utilized to restore the data, configuration information for each restore tool, and/or the like.

The protection data 40 also can include data corresponding to individual instances of each of the set of data protection solutions. For example, an individual instance of a data protection solution can include attributes such as, identification data corresponding to: the type of data protection solution being utilized for the instance; a computer system (e.g., the server name, IP address, and/or the like) where the source data is located; a set of nodes (e.g., virtual machines, and/or the like) on the server that are being backed up; a set of objects (e.g., file system, database, and/or the like) of the node that are being backed up; and/or the like. Furthermore, the various attributes of the instance stored in the protection data 40 can include data identifying one or more hardware components and/or software applications included in the computer system, which may be required to be included in a recreation of the computer system.

The protection data 40 also can include information corresponding to a set of requirements for the each instance of a data protection solution. The set of requirements can include, for example, a frequency with which the backup data needs to be validated, a type/depth of the validation(s) (e.g., amount of the data restored, amount of functionality tested on the restored data, and/or the like), and/or the like. In an embodiment, the computer system 20 is managed by a service provider, who provides data protection services for a plurality of customers. In this case, some or all of the protection data 40 can be defined by a service level agreement (SLA) corresponding to a customer and the corresponding data protection solution(s). To this extent, the protection data 40 also can include one or more guarantees provided by the service provider, a cost of the service, reporting requirements by the service provider, and/or the like.

In any event, the computer system 20 can perform a method of validating one or more of the data protection solutions defined in the protection data 40. To this extent, the computer system 20 can define a validation scenario, which can be stored in the validation data 42, using any solution. The validation scenario can define the backup data to be restored and a corresponding set of actions to be performed on the restored backup data in order to validate each data protection solution. In an embodiment, the computer system 20 can provide an interface for use by a user 12 in defining the validation scenario using a hierarchical breakdown process, in which the user 12 progressively drills down to a set of backup images to be validated during the validation scenario. The hierarchical breakdown process can require the user 12 to initially select a data protection solution to be included in the validation scenario by identification for the data protection solution, e.g., a name for the data protection solution. For a service provider, the identification information can comprise data identifying a customer (e.g., by name, account, and/or the like), and for each customer, data identifying one of a set of data protection solutions being provided for the customer.

Figure 2:
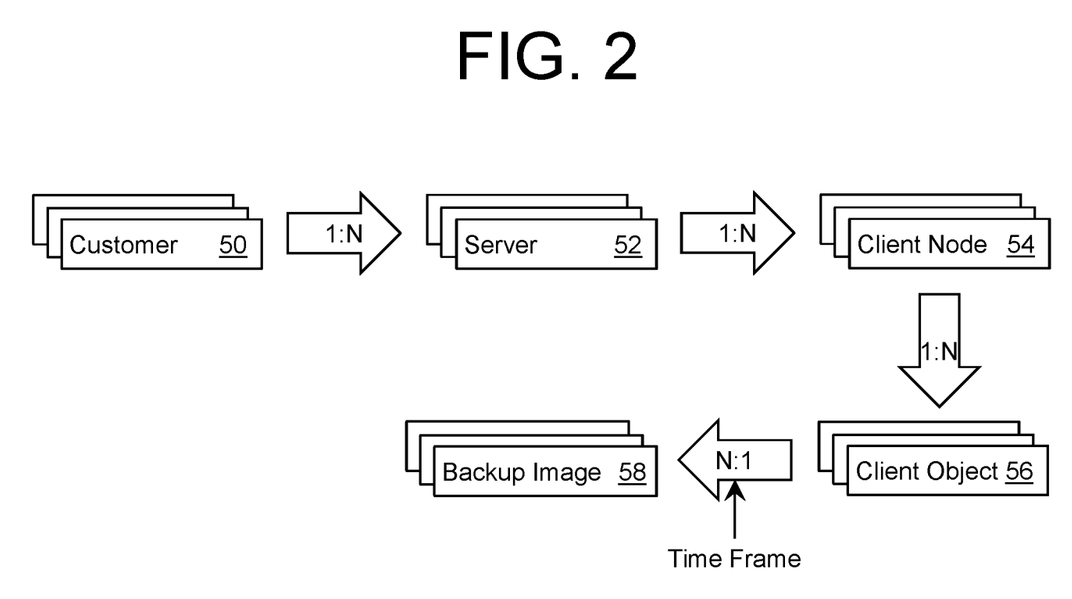
FIG. 2 shows an illustrative selection process for defining a set of backup images to be validated during a validation scenario according to an embodiment.

For example, FIG. 2 shows an illustrative selection process for defining a set of backup images to be validated during a validation scenario according to an embodiment. As illustrated, a user 12 (FIG. 1) can initially select one or more customers 50 to be included in the validation scenario. For each customer 50 selected, the user 12 can select one or more backup servers 52 corresponding to the customer 50, which includes backup data to be validated during the validation scenario. For each backup server 52 selected, the user 12 can select one or more client nodes 54 (e.g., individual client machines), which correspond to the backup data to be validated during the validation scenario. For each client node 54 selected, the user 12 can select one or more client objects 56 (e.g., a file system drive, a database, and/or the like) to be validated during the validation scenario.

The backup data for each client object 56 can include one or more backup images 58. A backup image 58 can comprise a full backup of the data stored on the client object 56 at a given time, an incremental backup of the data stored on the client object 56 at a given time, and/or the like. To this extent, selection of one or more backup images 58 for validation is dependent on the time frame (e.g., start and stop times) for the validation scenario. The user 12 can define the time frame for the validation scenario using any solution. Once the user 12 has selected a client object 56 to be validated during the validation scenario and a time frame for the validation scenario, the computer system 20 (FIG. 1) can automatically select one or more of the backup images 58 for the client object 56 based on a time frame for the validation scenario. For example, a given time frame can require selection of a backup image 58 corresponding to a full backup performed prior to/on the start date for the validation scenario, and zero or more incremental backup images 58 generated during the time frame.

While the hierarchical selection process is illustrated as including five tiers, it is understood that various embodiments of the invention can include more or fewer tiers. For example, when the hierarchical selection process is not performed by a service provider, a customer 50 need not be selected. Furthermore, when only one possibility exists for a particular tier (e.g., only one backup server, client node, and/or the like), the computer system 20 can automatically select the only possibility.

Figure 3:
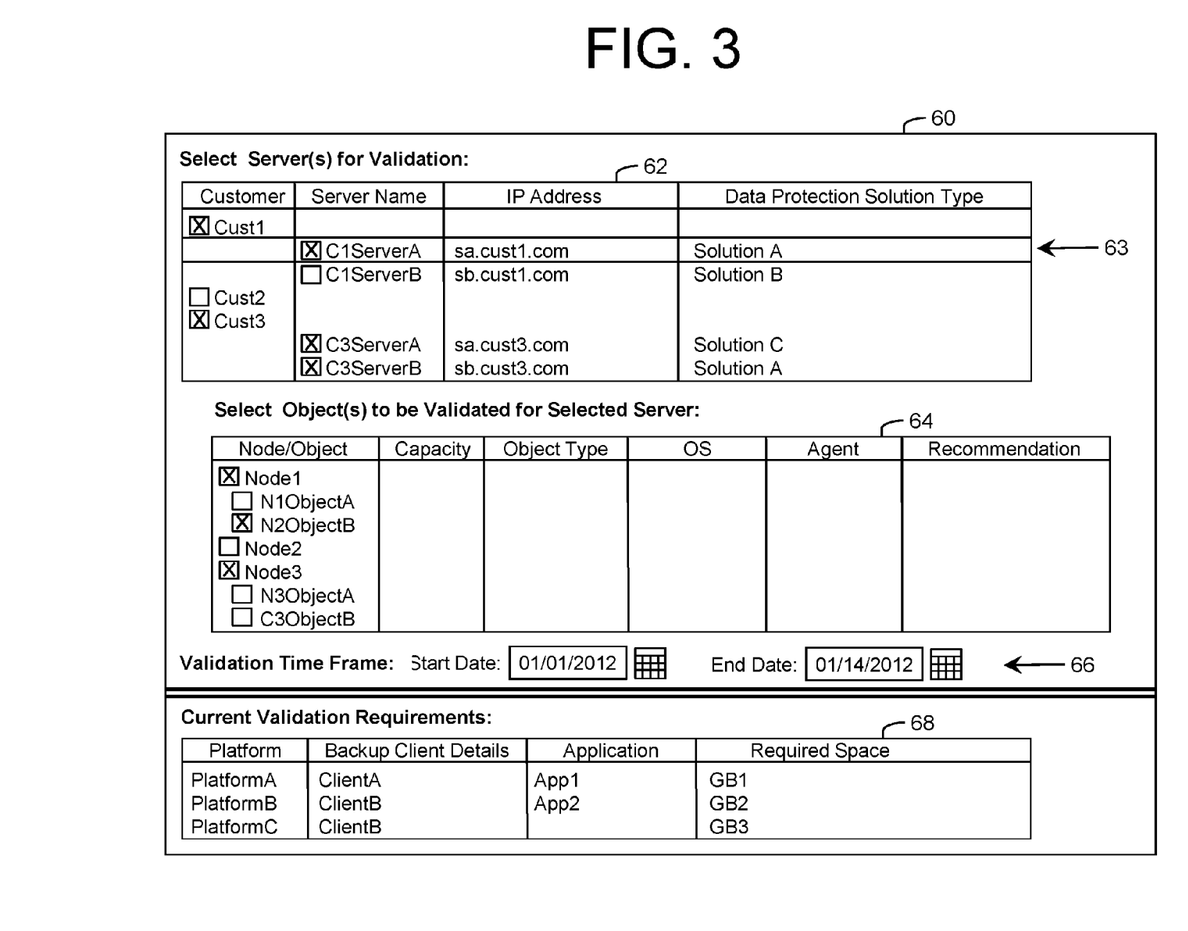
FIG. 3 shows an illustrative graphical user interface for defining a validation scenario according to an embodiment.

In an embodiment, the computer system 20 provides a set of user interfaces, such as one or more graphical user interfaces, for use by the user 12 in identifying the set of backup images 58 for validation during the validation scenario. For example, FIG. 3 shows an illustrative graphical user interface 60 for defining a validation scenario according to an embodiment. Interface 60 includes an interface mechanism 62 (e.g., a table with check boxes for entries in the first two columns, or the like), which enables selection of a set of backup servers for the validation scenario. As illustrated, the interface mechanism can enable the user to select a backup server by first selecting a customer and then selecting one or more of the servers corresponding to the customer. To this extent, the interface mechanism 62 can enable the selection of both the customer(s) and the server(s) for the validation scenario.

The interface 60 also includes an interface mechanism 64 (e.g., a table with entries presented in a tree structure having check boxes in the first column, or the like) for enabling the selection of a set of client nodes and/or a set of client objects corresponding to each client node for inclusion in the validation scenario. The mechanism 64 can be configured to show a list of possible client nodes/objects based on the server(s) selected using mechanism 62. For example, the mechanism 62 can include an actively selected server 63, from which the corresponding list of client nodes and objects is filled in the mechanism 64. Alternatively, the mechanism 64 can include a list of all the client nodes/objects for all of the servers currently selected to include in the validation scenario in the mechanism 62. In the latter case, the corresponding server (and customer, if applicable) can be indicated for the set of client nodes/objects included the mechanism 64.

The interface 60 further includes an interface mechanism 66 for enabling definition of a time frame for the validation scenario by the user 12. For example, the mechanism 66 can include user interface controls (e.g., text box with date selection button, or the like) for enabling selection of a start date and an end date for the validation scenario using any solution. In an embodiment, a default time frame can be provided, which the user 12 can alter, if desired.

It is understood that the user interface 60, the various mechanisms 62, 64, 66, and the data shown and described herein are only illustrative of various possible types of user interfaces and mechanisms that can be utilized and data that can be presented. To this extent, each mechanism 62, 64, 66 can be implemented using any combination of one or more user interface controls, which enable selection and/or definition of one or more attributes of the validation scenario, as well as provide the user 12 with any type of information, which can assist the user in defining the validation scenario. For example, one or more of the mechanisms 62, 64, 66 can display and/or enable the display of validation data 42 (e.g., within the recommendation column of the mechanism 64, by selecting a button to generate another window with additional information, highlighting/coloring/sorting entries differently, and/or the like) indicating when a previous validation was performed, the type validation, whether the validation was successful or failed, whether a server, node, and/or object is due for validation (e.g., under the terms of an SLA), and/or the like. Furthermore, computer system 20 can provide multiple user interfaces to enable the user 12 to identify the set of backup images by progressively drilling down to the set of backup images. For example the user interfaces can be accessed sequentially (e.g., using a wizard), accessed using a tabbed interface mechanism, and/or the like.

Figure 4:
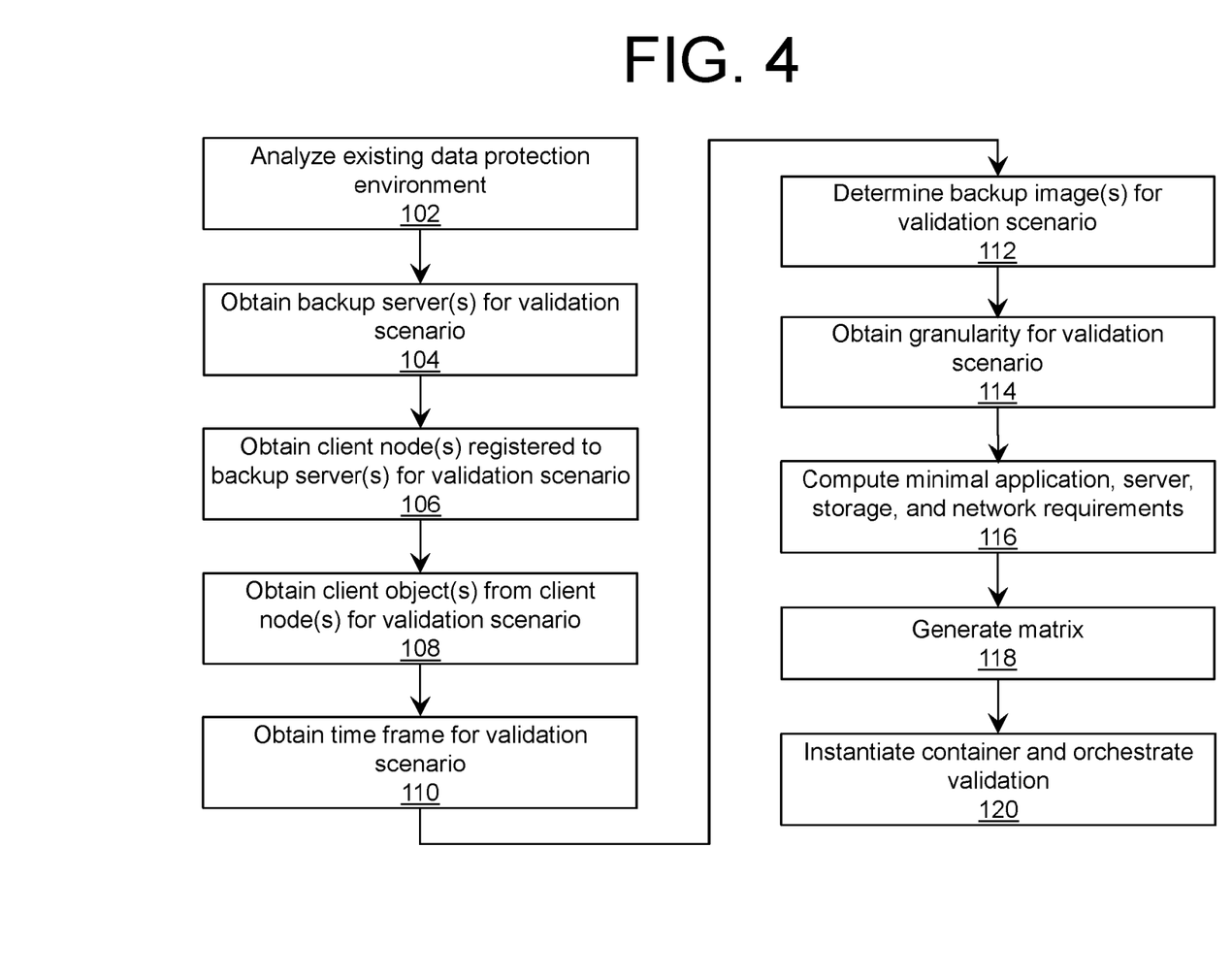
FIG. 4 shows an illustrative process for validating a set of data protection solutions according to an embodiment.

As discussed herein, the computer system 20 can enable the user 12 to make a series of selections to progressively drill down to define various attributes of the validation scenario. To this extent, FIG. 4 shows an illustrative process for validating a set of data protection solutions, which can be implemented by the computer system 20 (FIG. 1), according to an embodiment. Referring to FIGS. 1 and 4, in process 102, the computer system 20 can analyze an existing data protection environment 102 using any solution. For example, the computer system 20 can evaluate some or all of the protection data 40 and/or validation data 42 to generate a list of data protection solutions currently being managed and various attributes corresponding to each instance of the data protection solutions as described herein. The attributes for each instance can include, for example, data shown and described herein with respect to FIG. 2. Furthermore, the attributes can include data corresponding to previous validation(s) of the instance, if any, and data corresponding to validation requirements for the instance (e.g., based on an SLA, best practice, business practice, and/or the like).

In any event, the computer system 20 can use the analysis to identify a set of backup images 58 (FIG. 2) for the validation scenario by enabling a user 12 to progressively drill down to the backup images 58. For example, in process 104, the computer system 20 can obtain a set of backup servers 52 (FIG. 2) for the validation scenario using any solution, e.g., by obtaining a user's 12 selections via the interface mechanism 62 (FIG. 3). In process 106, the computer system 20 can obtain a set of client nodes 54 (FIG. 2) for the validation scenario using any solution, e.g., by obtaining a user's 12 selections of client node(s) 54 registered to previously selected backup server(s) 52 via the interface mechanism 64 (FIG. 3). In process 108, the computer system 20 can obtain a set of client objects 56 (FIG. 2) for the validation scenario using any solution, e.g., by obtaining a user's 12 selections of client object(s) corresponding to previously selected client node(s) 54 via the interface mechanism 64. In process 110, the computer system 20 can obtain a time frame for the validation scenario using any solution, e.g., by obtaining a user's 12 selections of start/stop dates via the interface mechanism 66 (FIG. 3).

Once the computer system 20 has a obtained a time frame and one or more client objects for the validation scenario, in process 112, the computer system 20 can determine a set of backup images 58 for the validation scenario using any solution. In particular, the computer system 20 can determine, based on the corresponding data protection solution for each client object in the validation scenario, which backup image(s) 58 include backup data corresponding to the time frame for the validation scenario.

In process 114, the computer system 20 can obtain a granularity for the validation scenario using any solution. For example, the computer system 20 can provide a mechanism, which enables the user 12 to select a granularity from a plurality of possible granularities for the validation scenario. Illustrative granularities can include, for example, a restore level (e.g., file, object, and/or the like), a restore mode (e.g., point in time, roll forward, and/or the like), an amount/type of validation of the restored data (e.g., signature-based validation, automated testing, intrusive/non-intrusive validation, and/or the like), etc.

In process 116, the computer system 20 can determine a set of resource requirements 44 (FIG. 1) for implementing the validation scenario using any solution. The set of resource requirements 44 can include, for example, a set of storage requirements, a set of server requirements, a set of application requirements, a set of network requirements, required personnel, a required amount of time, a total cost, and/or the like. Each hardware-based resource requirement can be defined using any solution, e.g., as a minimum requirement, a recommended range (e.g., minimum and maximum values), and/or the like. Each software-based requirement can be defined, e.g., as a software type, a software version, configuration information for the software, and/or the like.

In an embodiment, the computer system 20 can automatically generate some or all of the set of resource requirements 44 based on the set of backup images 58 and one or more of the attributes (e.g., time frame, validation granularity) of the validation scenario using any solution. For example, the computer system 20 can compute the set of application requirements (e.g., operating system(s), data protection software, application software, configuration information, etc.) based on the data for the corresponding server(s) 52, client node(s) 54, and/or client object(s) 56 included in the validation scenario, the validation granularity for the validation scenario, and/or the like. The set of application requirements can be determined based on, for example, an application configuration of the source computer system from which each of the backup image(s) 58 is generated, application(s) used to manage (e.g., display, edit, backup/restore, etc.) the data stored in the backup image(s) 58, a granularity for the validation (e.g., will the data be read/manipulated as part of the validation), and/or the like. The computer system 20 can merge the application requirements for different backup images 58 using, for example, a lowest common denominator approach.

Furthermore, the computer system 20 can compute the set of server requirements (e.g., minimum recommended processing component, memory, and/or the like) based on the data for the corresponding server(s) 52, client node(s) 54, and/or client object(s) 56 included in the validation scenario, the validation granularity for the validation scenario, and/or the like. For example, the set of server requirements can be determined based on, for example, the amount of processing to be performed as part of the validation, the hardware configuration of the source computer system from which each of the backup image(s) 58 is generated, an amount of time available for the validation, hardware requirements for the set of application requirements, and/or the like. In determining the set of server requirements, the computer system 20 can utilize a knowledge base included in the validation data 42, which can include data corresponding to previous validation hardware configurations, best practices for configuring a set of server requirements, interoperability data for the application(s) and/or hardware, and/or the like.

The computer system 20 also can compute the set of storage requirements based on the data for the corresponding server(s) 52, client node(s) 54, and/or client object(s) 56 included in the validation scenario, the validation granularity for the validation scenario, and/or the like. In an embodiment, the computer system 20 can calculate the set of storage requirements as a range of storage requirements (e.g., a minimum and maximum amount of storage). The computer system 20 can calculate the set of storage requirements based on, for example, the size of each backup image 58 in the set of backup images, an amount of processing to be performed on the data as part of the validation, storage requirements for one or more applications, and/or the like. The minimum and maximum storage requirements can be calculated for the time frame of the validation scenario based on, for example, an anticipated growth of data for an application during the time frame. Furthermore, the computer system 20 can utilize a knowledge base included in the validation data 42, which can include data corresponding to previous validation storage configurations, best practices for configuring a set of storage requirements, interoperability data for the application(s) and storage levels, and/or the like.

It is understood that the computer system 20 can compute various other types of requirements for the validation scenario using any solution. For example, the computer system 20 can determine a set of network requirements (e.g., required bandwidth, and/or the like) based on the application requirements, server requirements, and/or the like. Alternatively, the computer system 20 can assume that sufficient network requirements will be available. Similarly, other requirements, such as time, personnel, cost, and/or the like, can be calculated by the computer system 20 and provided for use by the user 12 in configuring the validation scenario.

In an embodiment, the computer system 20 can optimize or substantially optimize the set of resource requirements 44 for one or more goals. For example, the computer system 20 can determine the minimal amount, which will be required to perform the validation scenario, of one or more of: the set of storage requirements, the set of server requirements, the set of application requirements, the set of network requirements, required personnel, the required time, the total cost, and/or the like, using any solution. To this extent, the computer system 20 can be configured to determine the set of resource requirements 44 based on a set of goals, which can be selected by the user 12. In this manner, the user 12 can adjust one or more of the goals and determine its impact on the resulting sets of resource requirements 44.

In any event, the computer system 20 can provide the set of resource requirements 44 for presentation to the user 12 using any solution. For example, as shown in FIG. 3, the user interface 60 can include a separate display area (e.g., defined by the double lines), which includes an interface mechanism 68 (e.g., a table) for presenting the set of resource requirements 44 to the user 12. As illustrated, the interface mechanism 68 can include, for example, data corresponding to the set of application requirements (e.g., Backup Client Details, Application), the set of server requirements (e.g., Platform), the set of storage requirements (e.g., Required Space), and/or the like. However, it is understood that the data shown displayed in the interface mechanism 68 is only illustrative of various configurations of data that can be presented for use by the user 12.

In an embodiment, the computer system 20 can enable the user 12 to perform a "what-if" analysis for different possible configurations of the validation scenario using any solution. For example, in response to a change in the selection of one or more server(s), object(s), and/or the like, a change in the time frame, a change in the validation granularity, and/or the like, the computer system 20 can dynamically recalculate and update the set of resource requirements for the validation scenario and the information displayed in the interface mechanism 68. Furthermore, the computer system 20 can enable the user to view additional information regarding the validation scenario, which can assist in the user 12 in performing the analysis. For example, the computer system 20 can provide the user 12 with information regarding how a particular entry/configuration of the entry displayed in the interface mechanism 68 was determined (e.g., the selected server(s), object(s), time frame, granularity, and/or the like) as being required for the validation scenario.

Once the user 12 has defined a desired validation scenario, the computer system 20 can perform further processing for the validation scenario. For example, the computer system 20 can store the validation scenario as validation data 42. Furthermore, the computer system 20 can initiate performance of the validation scenario. For example, the computer system 20 can provide some or all of the set of resource requirements 44 for use by a validation system 14 in performing the validation scenario. The validation system 14 can use the set of resource requirements 44 to, for example, instantiate a container for the validation scenario, orchestrate the validation, and/or the like. For example, the validation system 14 can configure the server, applications, memory, and/or the like of an alternative computing infrastructure according to the set of resource requirements 44, obtain the set of backup images 58 for the validation scenario on the computing infrastructure, restore the data stored therein on the computing infrastructure, perform a set of required tests on the restored data using the computing infrastructure, and obtain a result for each of the required tests. After performing the validation scenario, the validation system 14 can provide a set of validation results 46 to the computer system 20, which can store the validation results 46 as validation data 42 and/or provide some or all of the validation results 46 for use by the user 12 using any solution. The validation results 46 can include, for example, the success/failure of a particular restoration/test included in the validation scenario, an amount of time required to perform the restoration, and/or the like.

As described herein, in an embodiment, the computer system 20 is managed by a service provider, which provides backup/restore services to a third party according to a service level agreement. In this case, the computer system 20 can be utilized by the service provider as part of a process defined by the service level agreement to assist the service provider in complying with the requirements specified in the service level agreement.

Figure 5:
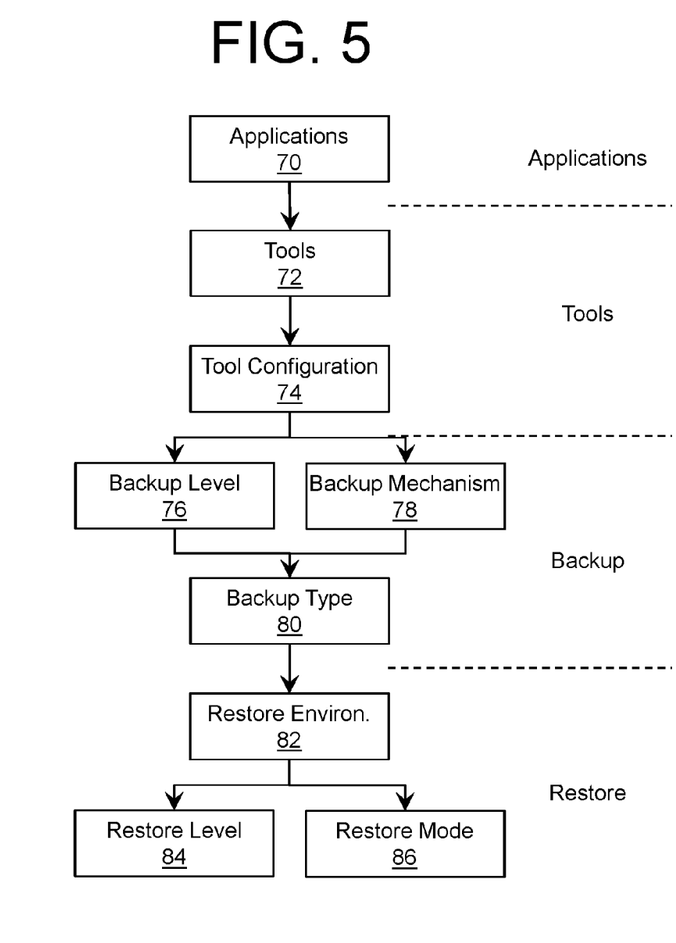
FIG. 5 shows an illustrative breakdown of a computer system in terms of backup strategy and test restore mechanism according to an embodiment.

To this extent, FIG. 5 shows an illustrative breakdown of a computer system in terms of backup strategy and test restore mechanism (e.g., a data protection solution), which can be defined in a service level agreement, according to an embodiment. In an applications segment, the breakdown can define a set of applications 70 of the computer system for which data is to be backed up. The set of applications 70 can include any of various types of applications including, for example, databases, email servers, and/or the like. In a tools segment, the breakdown can define a set of tools 72 of the computer system, such as enterprise backup software, which are used to backup the data, and a set of tool configurations 74 of the computer system, such as a variety of each tool, for the set of tools 72.

The breakdown also can include a backup segment, which can define a backup level 76 (e.g., file, image, application/object, and/or the like) and/or a backup mechanism 78 (e.g., full, incremental, and/or the like) for the backup tools 72. Additionally, the backup segment can include a backup type 80 (e.g., offline, online, and/or the like) for the various backups to be performed. The breakdown also can include a restore segment, which can define a restore environment 82 (e.g., same machine, new environment, and/or the like) for the computer system, as well as a restore level 84 (e.g., file, object, and/or the like) and a restore mode (e.g., point in time, roll forward, and/or the like) for the computer system.

Figure 6:
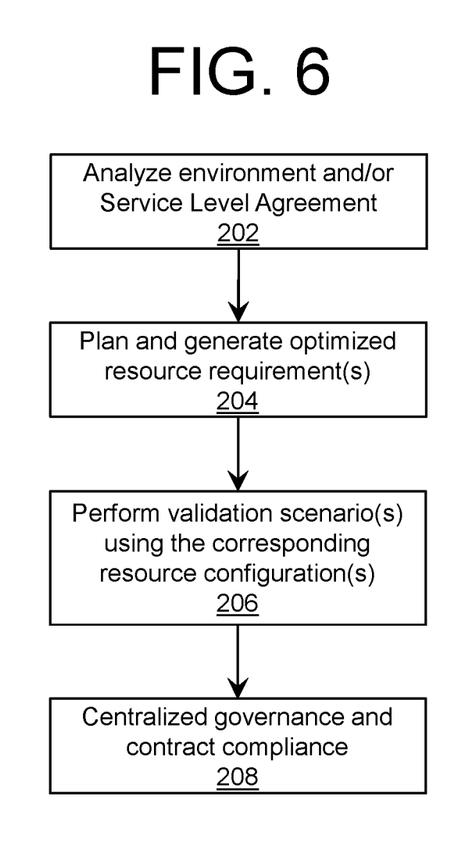
FIG. 6 shows an illustrative process for evaluating a backup strategy and test restore mechanism according to an embodiment.

FIG. 6 shows an illustrative process for evaluating a backup strategy and test restore mechanism, which can be defined in a service level agreement, according to an embodiment. Referring to FIGS. 1 and 6, in process 202, the computer system 20 can analyze the computer system environment and/or the service level agreement using any solution. For example, the computer system 20 can analyze the breakdown shown in FIG. 5 to determine all of the attributes of the computer system, which are relevant to generating and performing a validation scenario for the backup strategy and test restore mechanism. Based on the analysis, in process 204, the computer system 20 and/or the user 12 can plan and generate set(s) of resource requirements 44 for performing one or more validation scenarios, each of which can be optimized for one or more goals, as described herein. In process 206, the computer system 20 can manage the performance of each validation scenario, e.g., by the validation system 14, using a corresponding resource configuration defined by the set of resource requirements 44 for the validation scenario. In an embodiment, performing the validation scenario can include temporarily renting a hardware/software configuration (the validation system 14) from a third party computer services provider. In process 208, the computer system 20 can manage the centralized governance and contract compliance for the validation scenario(s). For example, the computer system 20 can receive and store the results of the validation, generate and provide one or more reports for use by the customer, and/or the like.

While shown and described herein as a method and system for validating a set of data protection solutions, it is understood that aspects of the invention further provide various alternative embodiments. For example, in one embodiment, the invention provides a computer program fixed in at least one computer-readable medium, which when executed, enables a computer system to validate a set of data protection solutions. To this extent, the computer-readable medium includes program code, such as validation program 30 (FIG. 1), which causes a computer system to implement some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, such as validation program 30 (FIG. 1), which causes a computer system to implement some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for validating a set of data protection solutions. In this case, a computer system, such as computer system 20 (FIG. 1), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer-implemented method of validating a set of data protection solutions, the method comprising:
    defining a validation scenario for the set of data protection solutions using a computer system, wherein the defining includes identifying a set of backup images for the validation scenario using a time frame, wherein each backup image in the set of backup images is generated using one of the set of data protection solutions; and
    determining, by the computer system, a set of resource requirements for implementing the validation scenario, by automatically generating the set of resource requirements for the validation scenario based on the set of backup images and a set of attributes for the validation scenario.

2. The method of claim 1, wherein the identifying includes providing an interface for use by a user in progressively drilling down to the set of backup images for the validation scenario.

3. The method of claim 2, wherein the interface comprises a set of user interfaces including:
    a first interface mechanism for enabling selection of a set of servers by the user;
    a second interface mechanism for enabling selection of a set of client nodes for each server in the set of servers by the user; and
    a third interface mechanism for enabling selection of a set of client objects for each client node in the set of client nodes by the user.

4. The method of claim 3, wherein the set of user interfaces further includes a customer interface mechanism for enabling selection of a set of customers by the user, wherein the first interface mechanism enables selection of a set of servers for each customer in the set of customers.

5. The method of claim 2, wherein the interface further includes a time frame interface mechanism for enabling definition of the time frame for the validation scenario by the user, wherein the identifying further includes automatically selecting the set of backup images based on the selected set of client objects and the time frame.

6. The method of claim 1, further comprising automatically updating the set of resource requirements for the validation scenario in response to a change to at least one of: the set of backup images or the set of attributes.

7. The method of claim 6, further comprising:
    providing a graphical user interface for use by a user, wherein the graphical user interface includes a first display area for enabling the user to drill down to the set of backup images and to define the validation time frame, and wherein the graphical user interface includes a second display area for displaying the set of resource requirements for the validation scenario, wherein the automatically updating is performed in response to a change requested by the user using the first display area; and
    dynamically updating the second display area for the set of resource requirements in response to the automatically updating.

8. A computer system comprising:
    a set of computing devices for validating a set of data protection solutions by performing a method comprising:
        defining a validation scenario for the set of data protection solutions using a computer system, wherein the defining includes identifying a set of backup images for the validation scenario using a time frame, wherein each backup image in the set of backup images is generated using one of the set of data protection solutions; and
        determining, by the computer system, a set of resource requirements for implementing the validation scenario, by automatically generating the set of resource requirements for the validation scenario based on the set of backup images and a set of attributes for the validation scenario.

9. The computer system of claim 8, wherein the identifying includes providing an interface for use by a user in progressively drilling down to the set of backup images for the validation scenario.

10. The computer system of claim 9, wherein the interface comprises a set of user interfaces including:
    a first interface mechanism for enabling selection of a set of servers by the user;
    a second interface mechanism for enabling selection of a set of client nodes for each server in the set of servers by the user; and
    a third interface mechanism for enabling selection of a set of client objects for each client node in the set of client nodes by the user.

11. The computer system of claim 10, wherein the set of user interfaces further includes a customer interface mechanism for enabling selection of a set of customers by the user, wherein the first interface mechanism enables selection of a set of servers for each customer in the set of customers.

12. The computer system of claim 9, wherein the interface further includes a time frame interface mechanism for enabling definition of the time frame for the validation scenario by the user, wherein the identifying further includes automatically selecting the set of backup images based on the selected set of client objects and the time frame.

13. The computer system of claim 8, the method further comprising automatically updating the set of resource requirements for the validation scenario in response to a change to at least one of: the set of backup images or the set of attributes.

14. A computer program product comprising program code embodied in at least one non-transitory computer-readable storage medium, which when executed, enables a computer system to implement a method of validating a set of data protection solutions, the method comprising:
    defining a validation scenario for the set of data protection solutions using a computer system, wherein the defining includes identifying a set of backup images for the validation scenario using a time frame, wherein each backup image in the set of backup images is generated using one of the set of data protection solutions; and
    determining, by the computer system, a set of resource requirements for implementing the validation scenario, by automatically generating the set of resource requirements for the validation scenario based on the set of backup images and a set of attributes for the validation scenario.

15. The computer program product of claim 14, wherein the identifying includes providing an interface for use by a user in progressively drilling down to the set of backup images for the validation scenario.

16. The computer program product of claim 15, wherein the interface comprises a set of user interfaces including:

a first interface mechanism for enabling selection of a set of servers by the user;

a second interface mechanism for enabling selection of a set of client nodes for each server in the set of servers by the user; and a third interface mechanism for enabling selection of a set of client objects for each client node in the set of client nodes by the user.

17. The computer program product of claim 16, wherein the set of user interfaces further includes a customer interface mechanism for enabling selection of a set of customers by the user, wherein the first interface mechanism enables selection of a set of servers for each customer in the set of customers.

18. The computer program product of claim 15, wherein the interface further includes a time frame interface mechanism for enabling definition of the time frame for the validation scenario by the user, wherein the identifying further includes automatically selecting the set of backup images based on the selected set of client objects and the time frame.

19. The computer program product of claim 14, the method further comprising automatically updating the set of resource requirements for the validation scenario in response to a change to at least one of: the set of backup images or the set of attributes.

* * * * *